(12) United States Patent
Anazawa

(10) Patent No.: US 11,042,304 B2
(45) Date of Patent: Jun. 22, 2021

(54) DETERMINING A TRANSFER RATE FOR CHANNELS OF A MEMORY SYSTEM

(71) Applicant: TOSHIBA MEMORY CORPORATION, Tokyo (JP)

(72) Inventor: Mitsuru Anazawa, Kanagawa (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 22 days.

(21) Appl. No.: 16/535,771

(22) Filed: Aug. 8, 2019

(65) Prior Publication Data

US 2020/0293198 A1 Sep. 17, 2020

(30) Foreign Application Priority Data

Mar. 15, 2019 (JP) .............................. JP2019-048742

(51) Int. Cl.
 *G06F 12/00* (2006.01)
 *G06F 3/06* (2006.01)
 *G06F 13/00* (2006.01)
 *G06F 13/28* (2006.01)

(52) U.S. Cl.
 CPC .......... *G06F 3/0611* (2013.01); *G06F 3/0659* (2013.01); *G06F 3/0679* (2013.01)

(58) Field of Classification Search
 CPC ..... G06F 3/0611; G06F 3/0679; G06F 3/0659
 See application file for complete search history.

(56) References Cited

U.S. PATENT DOCUMENTS

| 5,768,627 A * | 6/1998 | Jones .................. G06F 13/4217 |
| | | 710/15 |
| 9,244,519 B1* | 1/2016 | Ellis ...................... G06F 1/3253 |
| 2005/0157646 A1* | 7/2005 | Addagatla ............... H04L 47/21 |
| | | 370/232 |
| 2014/0156911 A1* | 6/2014 | Alcantara ............. G06F 3/0679 |
| | | 711/103 |
| 2015/0378640 A1 | 12/2015 | Huang |
| 2016/0011812 A1 | 1/2016 | Amaki |
| 2017/0279666 A1* | 9/2017 | Alshinnawi ......... H04L 41/0672 |
| 2018/0275892 A1 | 9/2018 | Shih |
| 2019/0065116 A1* | 2/2019 | Sekine .................. G06F 3/0634 |

* cited by examiner

*Primary Examiner* — Mark A Giardino, Jr.
(74) *Attorney, Agent, or Firm* — Foley & Lardner LLP

(57) ABSTRACT

A memory system includes first and second non-volatile memories and a memory controller respectively connected to the first and second non-volatile memories via first and second channels. The memory controller executes a first read operation of reading first data from the first non-volatile memory and a second read operation of reading second data from the second non-volatile memory in parallel in response to a first read request received from the outside, and sets a first transfer rate of the first channel to be lower than a second transfer rate of the second channel when a first time at which the first read operation is scheduled to be completed is earlier than a second time at which the second read operation is scheduled to be completed.

15 Claims, 11 Drawing Sheets

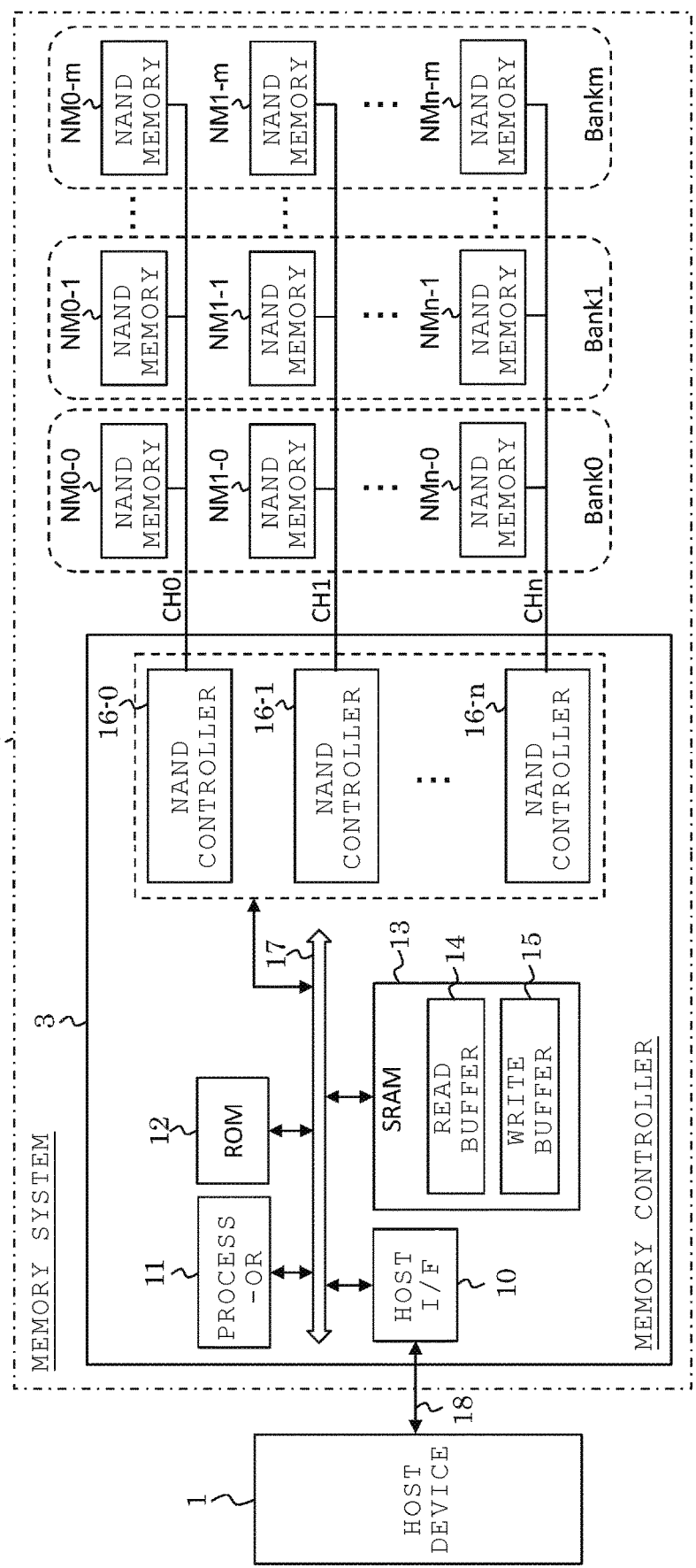

FIG. 2C

| TAG | CH | ESTIMATED COMPLETION TIME |
|---|---|---|
| 1 | CH0 | TM1 |
| 1 | CH1 | TM2 |
| 1 | CH2 | TM3 |
| ⋮ | ⋮ | ⋮ |

FIG. 2D

| SETTING INFORMATION | TRANSFER RATE | ODT VALUE |
|---|---|---|
| 1 | V1 | R1 |
| 2 | V2 | R2 |
| 3 | V3 | R3 |
| ⋮ | ⋮ | ⋮ |
| N | Vn | Rn |

DETERMINING A TRANSFER RATE FOR CHANNELS OF A MEMORY SYSTEM

CROSS-REFERENCE TO RELATED APPLICATION

This application is based upon and claims the benefit of priority from Japanese Patent Application No. 2019-048742, filed Mar. 15, 2019, the entire contents of which are incorporated herein by reference.

FIELD

Embodiments described herein relate generally to a memory system.

BACKGROUND

As an external storage device of an information processing device such as a personal computer, and the like, a solid state drive (SSD) is used in addition to a hard disk drive (HDD). The SSD includes a NAND type flash memory as a non-volatile semiconductor memory.

Recently, an SSD having higher performance is demanded, and such high performance is achieved not only by parallel access to a plurality of NAND type flash memories but also by a high-speed transfer rate. On the other hand, the power of a data input or output operation is dramatically increased due to the high-speed transfer rate. This is not only because the data input or output toggle becomes faster, but also because on-die termination (ODT) setting with a lower resistance value is required to stabilize a signal waveform as the speed increases.

Examples of related art include US-A-2018/0275892, US-A-2016/0011812, and US-A-2015/0378640.

DESCRIPTION OF THE DRAWINGS

FIG. 1 is a block diagram of a memory system according to a first embodiment;

FIG. 2C is a diagram illustrating an example of an estimated completion time table according to the first embodiment;

FIG. 2D is a diagram illustrating an example of setting information stored in a storage circuit according to the first embodiment;

DETAILED DESCRIPTION

Figure 2A:
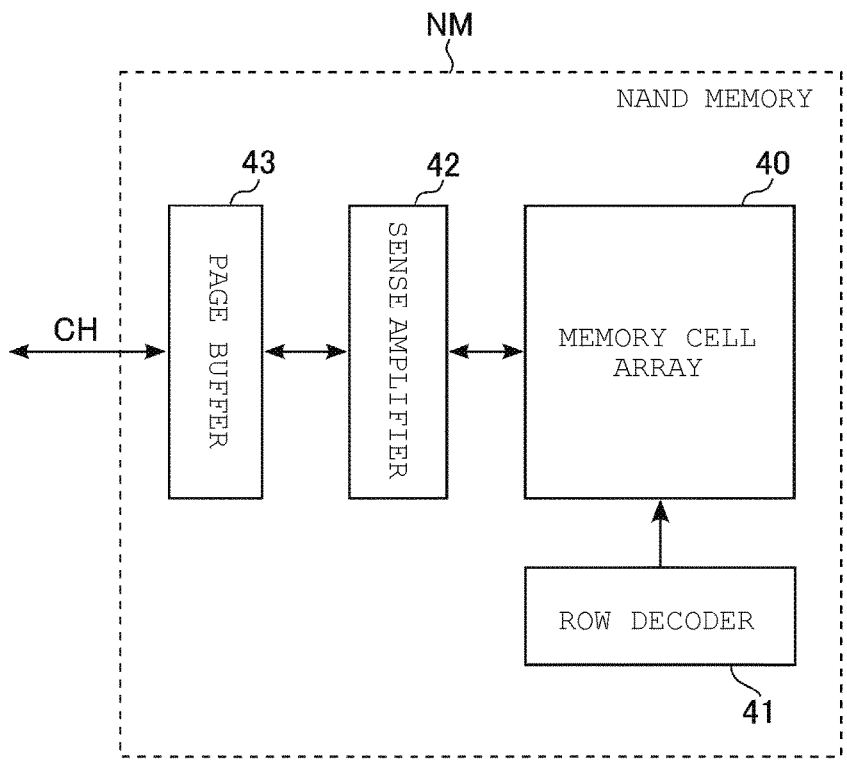
FIG. 2A is a block diagram of a NAND memory according to the first embodiment.

Embodiments provide a memory system and a memory controller capable of reducing power consumption while maintaining the performance.

According to one embodiment, in general, a memory system includes first and second non-volatile memories and a memory controller respectively connected to the first and second non-volatile memories via first and second channels. The memory controller executes a first read operation of reading first data from the first non-volatile memory and a second read operation of reading second data from the second non-volatile memory in parallel in response to a first read request received from the outside, and sets a first transfer rate of the first channel to be lower than a second transfer rate of the second channel when a first time at which the first read operation is scheduled to be completed is earlier than a second time at which the second read operation is scheduled to be completed.

Hereinafter, embodiments will be described with reference to the drawings. Some embodiments described below illustrate a device and a method for embodying technical ideas of the disclosure, and the technical ideas of the disclosure are not specified by a shape, a structure, an arrangement, and the like of each component. Each functional block may be implemented by either one of hardware and software or a combination of both hardware and software. Each functional block is not necessarily distinguished as in the following example. For example, some functions may be executed by a functional block different from the functional block shown in the example. Further, the functional block illustrated herein may be further divided into smaller functional sub-blocks.

Further, in the following description, components having the same function and configuration will be denoted by the same reference sign, and repeated descriptions thereof will be made only when necessary. When a plurality of components having common reference signs is distinguished, the plurality of components is distinguished by attaching branch numbers to the common reference signs. Further, when the plurality of components are not particularly distinguished, only the common reference signs are attached to the plurality of components, and the branch numbers are not attached thereto.

[1] First Embodiment

[1-1] Configuration of Memory System

FIG. 1 is a block diagram of a memory system 2 according to a first embodiment. The memory system 2 is connectable to a host device 1. The host device 1 is, for example, a CPU or a chipset in a personal computer or a server.

The memory system 2 may be configured with an solid state drive (SSD), a memory card such as an SD™ card, an embedded multimedia card (eMMC), or the like. Further, the memory system 2 may be configured by a system large-scale integrated circuit (system LSI) realized by one module or by a system-on-a-chip (SoC).

As illustrated in FIG. 1, the memory system 2 includes a memory controller 3 and a plurality of NAND type flash memories NM (hereinafter simply referred to as NAND memory) as non-volatile memories. Each of the plurality of NAND memories NM includes a plurality of memory cells, and may store data non-volatilely. FIG. 1 illustrates (m+1)× (n+1) pieces of NAND memories NM0-0 to NMn-m. (m+1) pieces of NAND memories NM arranged in a row direction are commonly connected to the same channel CH. That is, (m+1) pieces of NAND memories NM0-0 to NM0-m are commonly connected to a channel CH0; (m+1) pieces of NAND memories NM1-0 to NM1-m are commonly connected to a channel CH1; and (m+1) pieces of NAND memories NMn-0 to NMn-m are commonly connected to a channel CHn.

FIG. 2A is a block diagram of a NAND type flash memory NM. Each of the NAND memories NM includes a memory cell array 40, a row decoder 41, a sense amplifier 42, and a page buffer 43.

The memory cell array 40 includes a plurality of memory cells connected to word lines and bit lines, and may store data non-volatilely. The row decoder 41 decodes a row address received from the memory controller 3 and selects the word line based upon the decoding result of the row address. When reading data, the sense amplifier 42 detects and amplifies the data read from the memory cell to the bit line, and then outputs the amplified data to the page buffer 43. Further, when writing data, the sense amplifier 42 transfers write data received from the page buffer 43 to the bit line. When reading data, the page buffer 43 temporarily stores the data read from the memory cell in the memory cell array 40 via the sense amplifier 42, and then outputs the data to the memory controller 3. When writing data, the page buffer 43 temporarily stores write data received from the memory controller 3, and then outputs the write data to the memory cell in the memory cell array 40 via the sense amplifier 42.

Referring again to FIG. 1, (n+1) pieces of NAND memories NM arranged in a column direction form one bank BK. That is, (n+1) pieces of NAND memories NM0-0 to NMn-0 form a bank 0; (n+1) pieces of NAND memories NM0-1 to NMn-1 form a bank 1; and (n+1) pieces of NAND memories NM0-m to NMn-m form a bank m.

The memory controller 3 instructs the NAND memory NM to perform writing, reading, erasing, and the like, for example, in response to an access request from the host device 1. Further, the memory controller 3 manages a memory space of the NAND memory NM. The memory controller 3 includes a host interface circuit 10 (also referred as a host I/F), a processor 11, a read only memory (ROM) 12, and a static random access memory (SRAM) 13, (n+1) pieces of NAND controllers 16-0 to 16-n, and the like. These modules are connected to each other via a bus 17. The memory controller 3 may be configured by a system-on-a-chip (SoC).

The host interface circuit 10 is connected to the host device 1 via a bus 18. The host interface circuit 10 performs interface processing with the host device 1 according to a predetermined protocol. Further, the host interface circuit 10 transmits and receives an instruction, an address, and data to and from the host device 1. The host interface may conform to Serial Advanced Technology Attachment (SATA), Peripheral Component Interconnect Express (PCIe)™, Serial Attached SCSI (SAS), Non-Volatile Memory Express (NVMe)™, and the like.

The processor 11 is configured by, for example, a central processing unit (CPU). The processor 11 controls an overall operation of the memory controller 3. For example, when receiving a read request from the host device 1, the processor 11 issues a read command in accordance with a NAND interface to the NAND memory NM via the NAND controller 16 in response thereto. The same is applied to writing and erasing. Further, the processor 11 executes various processing for managing the NAND memory NM such as wear leveling, garbage collection (compaction), and the like.

The ROM 12 stores software used by the processor 11. The processor 11 may execute a predetermined operation by executing the software stored in the ROM 12. Further, the software used by the processor 11 may be stored in the NAND memory NM. In this case, the processor 11 reads the software from the NAND memory NM, stores the read software in the SRAM 13, and executes the software stored in the SRAM 13.

The SRAM 13 is a kind of volatile memory. The SRAM 13 is used as a work area of the processor 11, and stores the software read from the NAND memory NM, various tables, and the like generated by the processor 11. Further, the SRAM 13 is also used as a data buffer. The SRAM 13 includes a read buffer 14 for temporarily storing read data read from the NAND memory NM and a write buffer 15 for temporarily storing write data to be written into the NAND memory NM. Further, the memory controller 3 may include a dynamic random access memory (DRAM) externally. The DRAM is used for almost the same usage as that of the SRAM 13.

The NAND controllers 16-0 to 16-n are respectively connected to the channels CH0 to CHn. Each of the channels CH0 to CHn is configured by a plurality of signal lines. The NAND controller 16 performs interface processing with the NAND memory NM according to a predetermined protocol. Further, the NAND controller 16 transmits and receives an instruction, an address, and data to and from the NAND memory NM. The NAND controller 16 may perform a parallel operation by a plurality of channels and a bank interleave operation by a plurality of banks.

[1-1-1] Configuration of NAND Controller 16

Figure 2B:
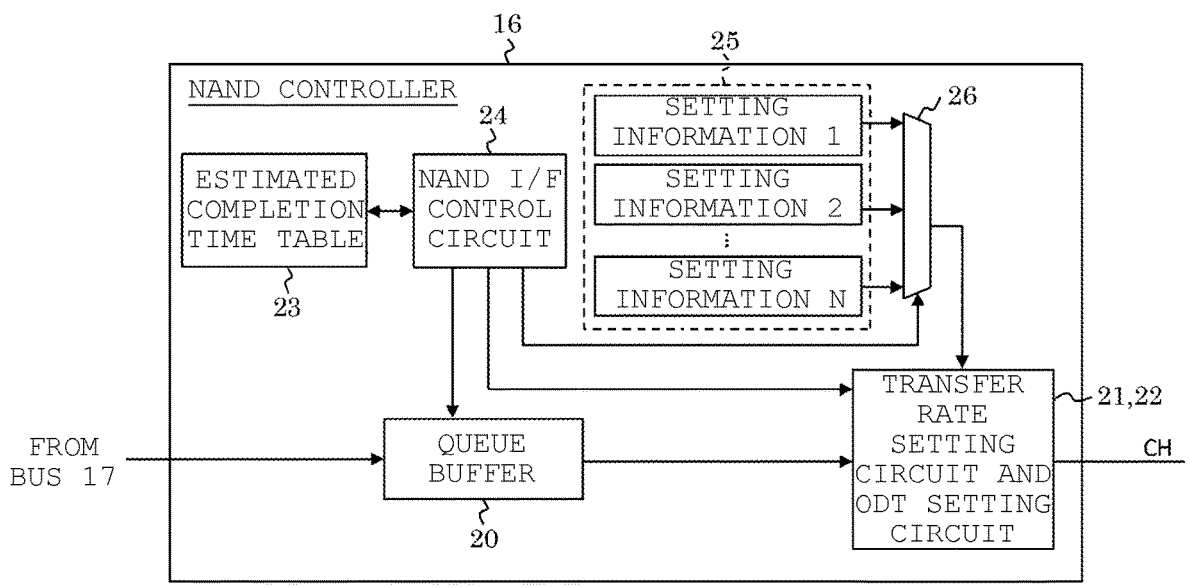
FIG. 2B is a block diagram of a NAND controller according to the first embodiment.

FIG. 2B is a block diagram of an example of one NAND controller 16.

The NAND controller 16 includes a queue buffer 20, a transfer rate setting circuit 21, an on-die termination (ODT) setting circuit 22, an estimated completion time table 23, a NAND interface control circuit 24, a storage circuit 25, and a selection circuit 26.

The queue buffer 20 stores a plurality of commands transmitted from the processor 11 in the order of transmission.

The transfer rate setting circuit 21 is connected to the channel CH. The transfer rate setting circuit 21 sets a transfer rate of data to be transferred to the channel CH according to an instruction from the NAND interface control circuit 24. The transfer rate is an amount of data to be transferred within a unit time. For example, the transfer rate setting circuit 21 may change the transfer rate as to the NAND memory to be connected to a target channel CH by changing a frequency of the operation clock of the transfer rate setting circuit 21 or by intermittently operating the transfer rate setting circuit 21.

The ODT setting circuit 22 sets a termination resistance of the channel CH according to the instruction from the NAND interface control circuit 24. The termination resistance is also referred to as the ODT. When the transfer rate is relatively high, the ODT setting circuit 22 can set the termination resistance to be low, and when the transfer rate is relatively low, the ODT setting circuit 22 can set the termination resistance to be higher than that of when the transfer rate is high. Further, depending on cases, the termination resistance may be set to an off-state. An example configuration of the ODT setting circuit 22 will be described in further detail below.

The NAND interface control circuit 24 transmits commands stored in the queue buffer 20 to the NAND memory NM in the order of storage of the commands. The NAND interface control circuit 24 schedules access to the NAND memory NM. In this scheduling, the NAND interface control circuit 24 determines an estimated completion time of the command. The NAND interface control circuit 24 changes the transfer rate of the channel CH via the transfer rate setting circuit 21 and changes the termination resistance of the ODT setting circuit 22, based upon the above-described scheduling.

FIG. 2C is a diagram illustrating an example of the estimated completion time table 23 provided in the NAND controller 16. The estimated completion time table 23 stores the estimated completion time of the command determined by the NAND interface control circuit 24. For example, as illustrated in FIG. 2C, the estimated completion time table 23 stores a tag (1) attached to an access request transmitted from the host device 1, the channel CH and the estimated completion time associated with the tag. The estimated completion time table 23 is stored in a volatile memory or a non-volatile memory.

FIG. 2D is a diagram illustrating an example of setting information stored in the storage circuit 25. The storage circuit 25 stores N pieces of setting information 1 to N. Each of the setting information 1 to N includes information about the transfer rate and an ODT value. As illustrated in FIG. 2D, for example, setting information 1 indicates a case where the transfer rate is high, and includes V1 as the transfer rate and R1 as the ODT value associated with the setting information 1. Setting information 2 indicates a case where the transfer rate is low, and includes V2 as the transfer rate and R2 as the ODT value associated with the setting information 2. Further, setting information 3 indicates a case where the transfer rate is extremely low, and includes V3 as the transfer rate and R3 as the ODT value associated with the setting information 3. The storage circuit 25 is configured by, for example, a volatile memory such as an SRAM or a register, and the like embedded in the memory controller 3, or a non-volatile memory. The processor 11, for example, reads the setting information from the ROM 12 or the NAND memory NM and stores the read setting information in the SRAM 13 at the time of initialization such as when power starts to be supplied to the memory system 2, and the like.

The selection circuit 26 selects one of the setting information 1 to N according to the instruction from the NAND interface control circuit 24. The setting information selected by the selection circuit 26 is sent to the transfer rate setting circuit 21 and the ODT setting circuit 22.

[1-1-2] Configuration of ODT Setting Circuit 22

Figure 3:
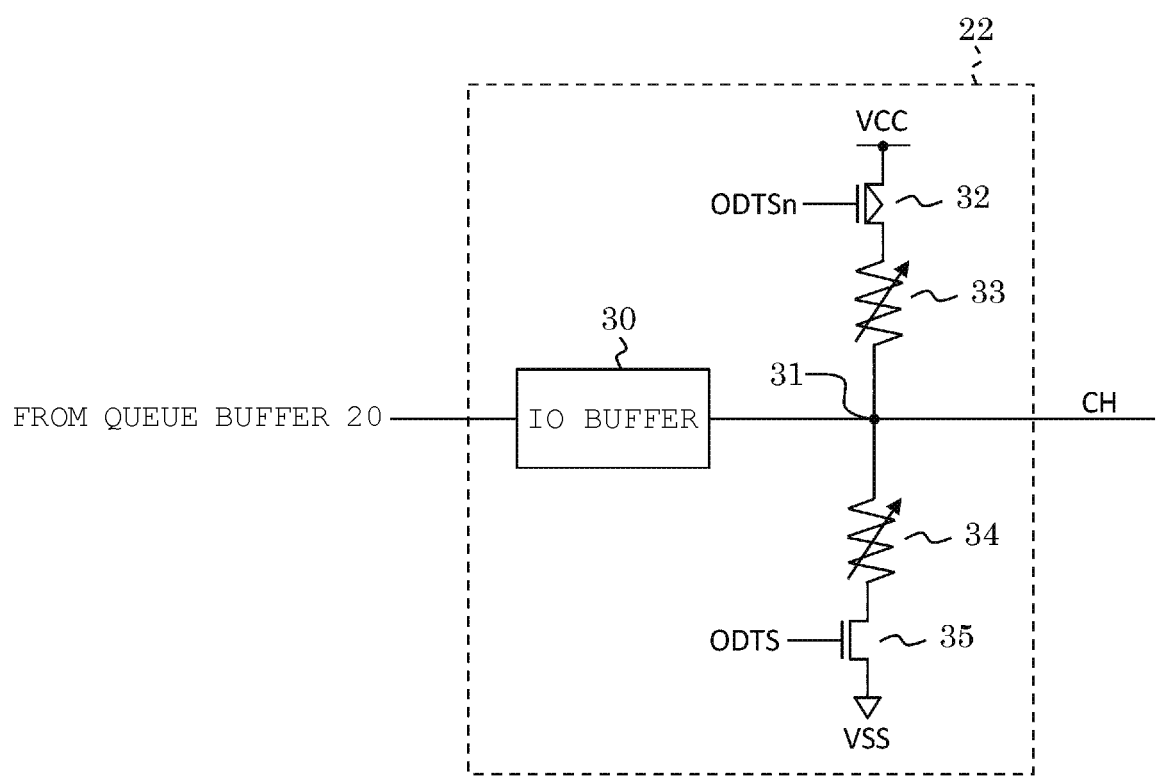
FIG. 3 illustrates a circuit diagram of an ODT setting circuit according to the first embodiment.

FIG. 3 is a circuit diagram of the ODT setting circuit 22. A circuit portion connected to one signal line in the channel CH is illustrated in FIG. 3. In reality, the ODT setting circuit 22 includes circuit portions the number of which corresponds to the number of a plurality of signal lines such as DQ (data) lines and DQS (data strobe) lines.

The ODT setting circuit 22 includes an IO buffer 30, a P-channel MOS transistor 32 as a switch element, variable resistance elements 33 and 34, and an N-channel MOS transistor 35 as a switch element.

One end of the IO buffer 30 is connected to one signal line in the channel CH via a node 31, and the other end thereof is connected to the queue buffer 20.

A source of the P-channel MOS transistor 32 is connected to a power supply terminal to which a power supply voltage VCC is applied, and a drain thereof is connected to one end of the variable resistance element 33. A signal ODTSn is input from the NAND interface control circuit 24 to a gate of the P-channel MOS transistor 32. The other end of the variable resistance element 33 is connected to one end of the variable resistance element 34 via the node 31.

A drain of the N-channel MOS transistor 35 is connected to the other end of the variable resistance element 34, and a source thereof is connected to a ground terminal to which a ground voltage VSS is applied. A signal ODTS is input from the NAND interface control circuit 24 to a gate of the N-channel MOS transistor 35. The signal ODTS is an inverted signal of the signal ODTSn.

A resistance value of the variable resistance element 33 is set by a signal (not illustrated) transmitted from the NAND interface control circuit 24. A resistance value of the variable resistance element 34 is set by a signal (not illustrated) transmitted from the NAND interface control circuit 24.

In the ODT setting circuit 22 configured as described above, when the signal ODTS is at a high level and the signal ODTSn is at a low level, the termination resistance of the signal line in the channel CH can be set to a predetermined resistance value.

[1-2] Operation of Memory System 2

Figure 4:
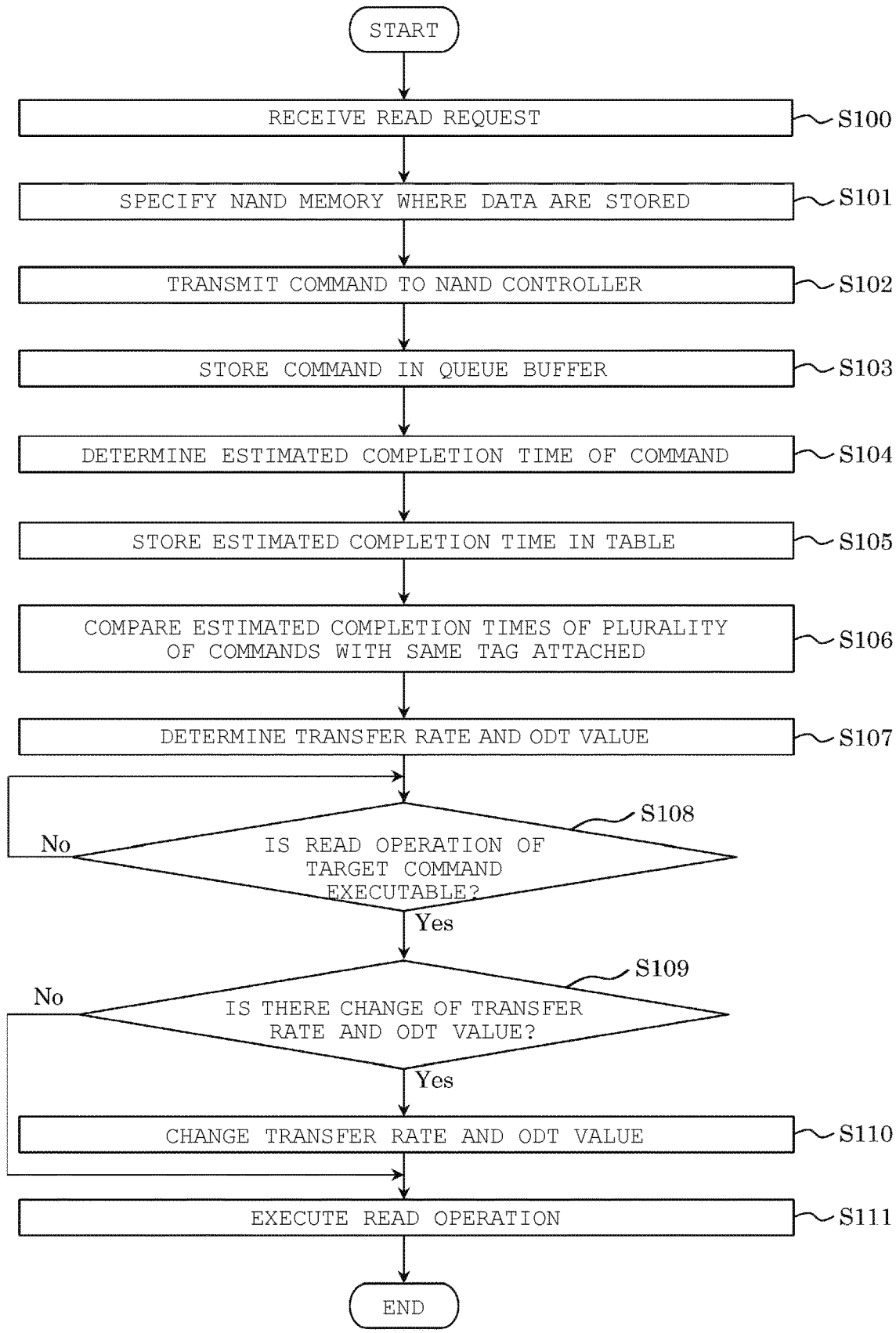
FIG. 4 is a flowchart illustrating a read operation of the memory system according to the first embodiment.

The operation of the memory system 2 configured as described above will be described. First, the entire flow of the read operation will be described. FIG. 4 is a flowchart illustrating the read operation of the memory system 2 according to the first embodiment.

The processor 11 receives a read request from the host device 1 (step S100). The read request includes an address. The processor 11 specifies the NAND memory NM where the data designated by the read request are stored (step S101). In step S101, a lookup table (LUT) indicating a correspondence relationship between a logical address and a physical address is used. The logical address is an address for the host device 1 to indicate a logical data location of a read and write target in the memory system 2. The physical address is an address indicating a physical data location of a read and write target in the NAND memory NM. The NAND memory NM where the data are stored can be specified by obtaining the physical address from the logical address by using the LUT.

The processor 11 transmits a read command to all the NAND controllers 16 corresponding to each of the NAND memories NM specified in step S101 (step S102). At this time, the processor 11 attaches the same tag to a plurality of read commands related to the same read request. The read commands also include the addresses.

The processor 11 stores the read command transmitted in step S102 in the queue buffer 20 (step S103).

The NAND interface control circuit 24 determines an estimated completion time of the read command stored in the queue buffer 20 (step S104). The NAND interface control circuit 24 stores the estimated completion time determined in step S104 together with the tag in the estimated completion time table 23 (step S105).

The NAND interface control circuit 24 refers to the estimated completion time table 23, and compares the estimated completion time of the plurality of read commands to which the same tag is attached and which are executed through the plurality of channels CH (step S106). The NAND interface control circuit 24 calculates a time difference from the latest estimated completion time, and determines a transfer rate and an ODT value by using the time difference (step S107).

The NAND interface control circuit 24 determines whether or not a read operation of the read command to which a tag of the current target is attached (referred to as a target read command or simply referred to as a target command) is executable (step S108). In this step S108, the read operation of the target command becomes executable after all the commands stored in the queue buffer 20 prior to the target command are completed and the target command becomes an execution target.

When the read operation of the target command is executable in step S108 (step S108=Yes), the NAND interface control circuit 24 determines whether or not there is a change in the transfer rate and the ODT value (step S109). When the read operation of the target command is not executable in step S108 (step S108=No), the NAND interface control circuit 24 determines to wait until all the commands stored in the queue buffer 20 prior to the target command are completed. Further, the transfer rate before the change is set to the fastest transfer rate, and the ODT value before the change is set to the lowest resistance value.

When the transfer rate and the ODT value are changed in step S109 (step S109=Yes), the NAND interface control circuit 24 changes the transfer rate and the ODT value (step S110). Specifically, the NAND interface control circuit 24 selects, based upon the time difference between the latest or longest estimated completion time among the estimated completion times to which the same tag is attached and the estimated completion time of the target command, one of the N pieces of setting information 1 to N stored in the storage circuit 25, and then transfers the selected setting information to the transfer rate setting circuit 21 and the ODT setting circuit 22. The transfer rate setting circuit 21 sets the transfer rate based upon the setting information. The ODT setting circuit 22 sets the ODT value based upon the setting information.

Thereafter, the NAND interface control circuit 24 executes the read operation on the NAND memory NM (step S111). When the transfer rate and the ODT value are not changed in step S109 (step S109=No), the NAND interface control circuit 24 proceeds to step S111.

[1-3] Specific Example of Read Operation

Figure 5:
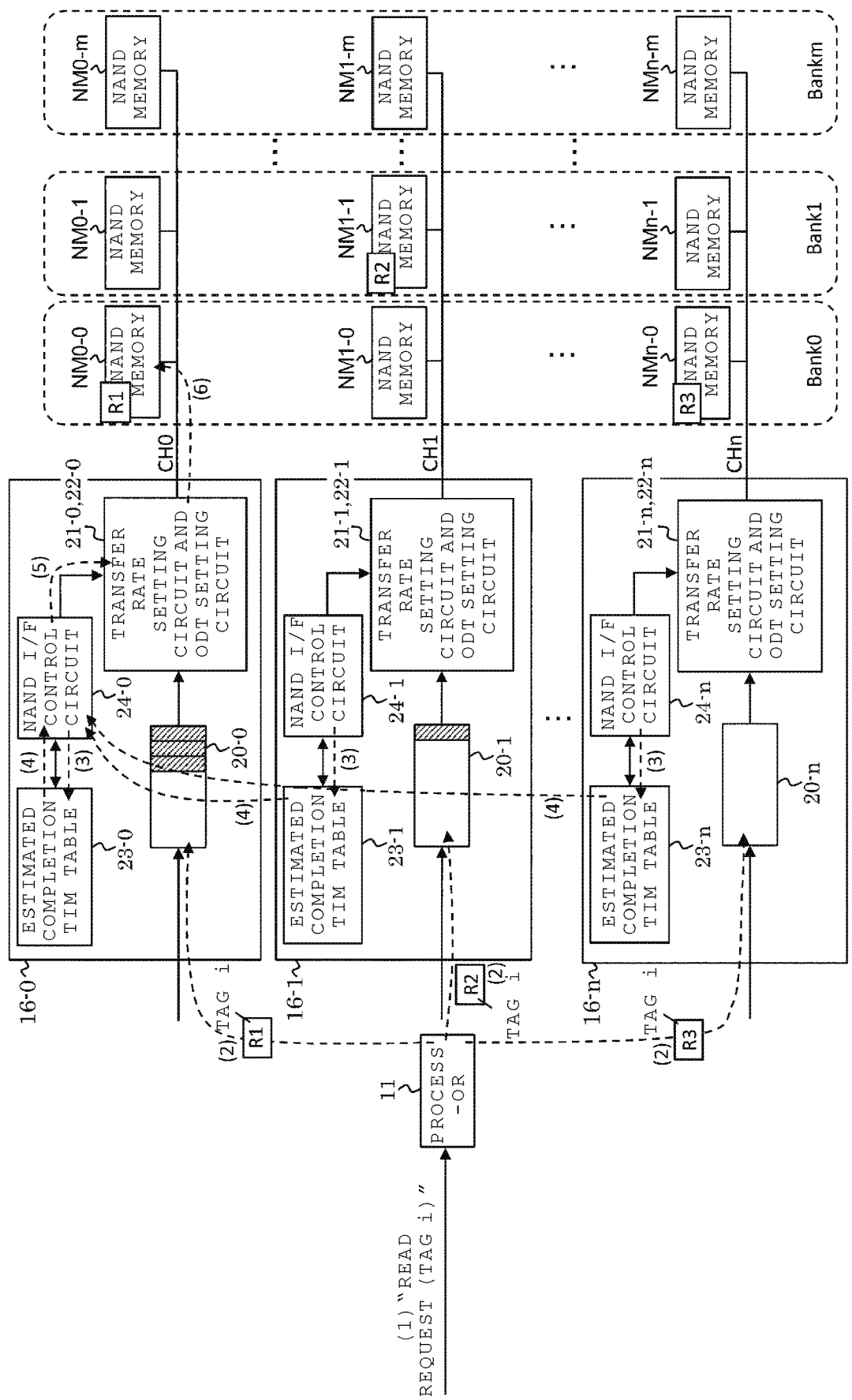
FIG. 5 is a schematic diagram illustrating a specific example of the read operation of the memory system; according to the first embodiment
Figure 6:
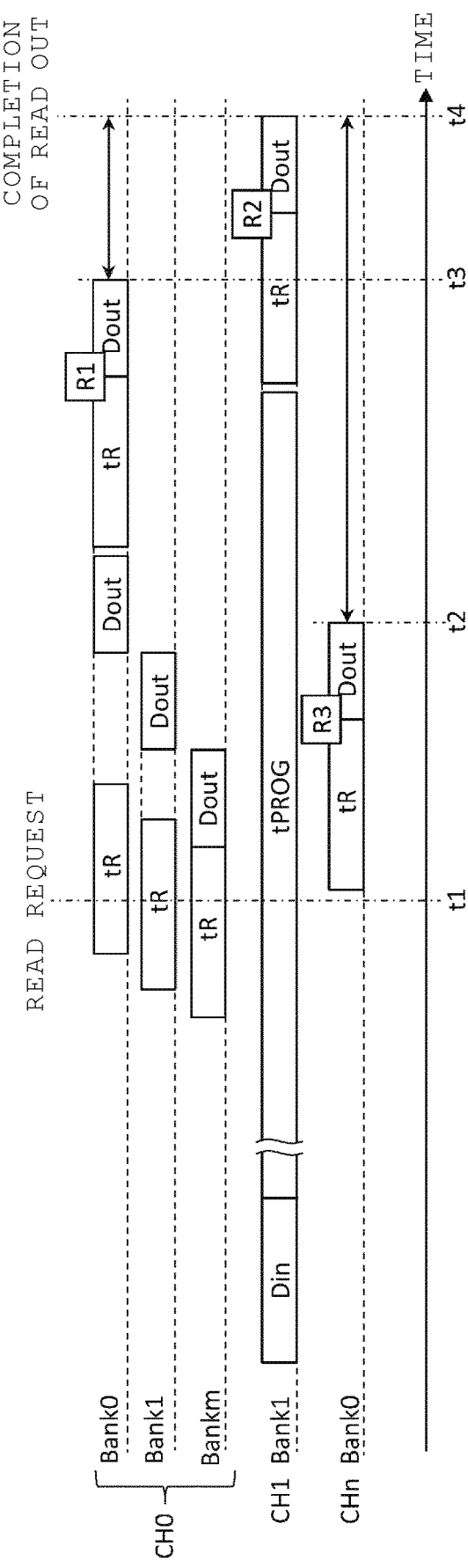
FIG. 6 is a timing chart illustrating a read operation before a transfer rate is changed according to the first embodiment.
Figure 7:
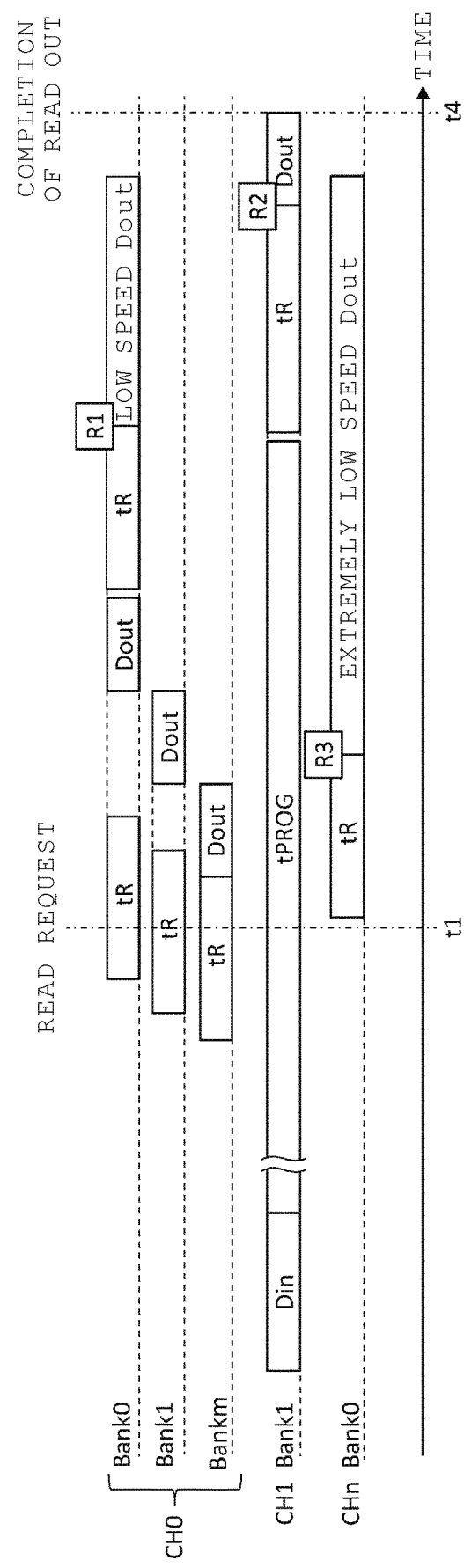
FIG. 7 is a timing chart illustrating a read operation after the transfer rate is changed according to the first embodiment.

Next, a specific example of a read operation of the memory system 2 will be described. FIG. 5 is a schematic diagram illustrating a specific example of the read operation of the memory system 2. FIG. 6 is a timing chart illustrating the read operation before the transfer rate is changed. FIG. 7 is a timing chart illustrating the read operation after the transfer rate is changed.

In FIGS. 6 and 7, "tR" represents a sense operation from the memory cell array 40 to the page buffer 43; "tPROG" represents a program operation from the page buffer 43 to the memory cell array 40; "bout" represents a data output operation from the page buffer 43 to the memory controller 3; and "Din" represents a data input operation from the memory controller 3 to the page buffer 43. In FIGS. 6 and 7, the bank 0 of the channel CH0 corresponds to the NAND memory NM0-0; the bank 1 of the channel CH0 corresponds to the NAND memory NM0-1; the bank m of the channel CH0 corresponds to the NAND memory NM0-$m$; the bank 1 of the channel CH1 corresponds to the NAND memory NM1-1; and the bank 0 of the channel CHn corresponds to the NAND memory NMn–0.

In the example illustrated in FIG. 5, data designated by the read request are stored in the NAND memories NM0-0, NM1-1, and NMn–0. The read command for reading the data from the NAND memory NM0-0 is represented as "R1", the read command for reading the data from the NAND memory NM1-1 is represented as "R2", and the read command for reading the data from the NAND memory NMn–0 is represented as "R3".

At the time t1 shown in FIG. 6, the processor 11 receives the read request relating to the read commands R1 to R3 from the host device 1 (step (1) in FIG. 5). Tags relating to the read commands R1 to R3 are represented as "i".

At the time t1 shown in FIG. 6, the NAND memories NM0-0, NM0-1, NM0-$m$ connected to the channel CH0 are in the process of executing a read operation. The data are output to the channel CH0 from the NAND memories NM in the order of the NAND memory NM0-$m$, the NAND memory NM0-1, and the NAND memory NM0-0. The NAND memory NM1-1 connected to the channel CH1 is in the process of executing a write operation. The NAND memory NMn–0 connected to the channel CHn does not execute any commands.

The processor 11 transmits the read command R1 to which the tag i is attached to a queue buffer 20-0, transmits the read command R2 to which the tag i is attached to a queue buffer 20-1, and transmits the read command R3 to which the tag i is attached to a queue buffer 20-$n$ (step (2) in FIG. 5). The number of hatched (shaded) squares shown in the queue buffers 20-0 and 20-1 in FIG. 5 symbolically represents such a read or write command. For example, for the channel CH0, three read commands which are in the process of being executed and are waiting for the completion at the time t1 are stored in the queue buffer 20-0, so three hatched squares are shown in the queue buffer 20-0. For the channel CH1, one write command which is in the process of being executed and is waiting for the completion at the time t1 is stored in the queue buffer 20-1, so one hatched square is shown in the queue buffer 20-1. For the channel CHn, as no command is in the process at the time t1, no hatched square is shown in the queue buffer 20-$n$.

NAND interface control circuits 24-0, 24-1, and 24-$n$ determine the estimated completion times of the read commands R1, R2, and R3 stored in the queue buffers 20-0, 20-1, and 20-$n$, respectively. Next, the NAND interface control circuits 24-0, 24-1, and 24-$n$ store the estimated completion times together with the tags in the estimated completion time tables 23-0, 23-1, and 23-$n$ (step (3) in FIG. 5), respectively. In FIG. 6, the estimated completion time of the read command R3 is t2, the estimated completion time of the read command R1 is t3, and the estimated completion time of the read command R2 is t4.

The NAND interface control circuit 24-0 refers to the estimated completion time tables 23-0, 23-1, and 23-$n$, and then compares the estimated completion times of the read commands R1, R2, and R3 to which the tag i is attached (step (4) in FIG. 5). In the example of FIG. 6, the latest estimated completion time (the time that is at the latest) among the read commands R1, R2, and R3 is the time corresponding to the read command R2, t4.

The NAND interface control circuit 24-0 calculates a time difference from the latest estimated completion time t4, and determines the transfer rate and the ODT value by using the time difference (step (5) in FIG. 5). In step (5) in FIG. 5, illustrations of the storage circuit 25 and the selection circuit 26 are omitted for brevity purposes. Next, the NAND interface control circuit 24-0 executes the read operation (step (6) in FIG. 5). The NAND interface control circuits 24-1 and 24-$n$ also execute the same processing as that of steps (4) to (6) in FIG. 5. Note that, as described in the example, the NAND interface control circuit 24 determines the transfer rate and the ODT value by using the time difference of the estimated completion times and sets the determined transfer rate and ODT value, but the processor 11 may execute the above-described operations.

In FIG. 7, among the commands R1-R3, the estimated completion time t4 of the command R2 by the NAND controller 16-1 is the latest. Accordingly, the NAND controller 16-1 executes the data output operation of the command R2 at a high-speed transfer rate. The data output operation at a high-speed transfer rate is indicated by "bout". The estimated completion time of the command R1 by the NAND controller 16-0 is the second latest next to the command R2 by the NAND controller 16-1. Therefore, the NAND controller 16-0 executes the data output operation of the command R1 at a transfer rate lower than the high speed (referred to as a low speed). The estimated completion time of the command R3 by the NAND controller 16-n is the fastest. Therefore, the NAND controller 16-n executes the data output operation of the command R3 at a transfer rate lower than the low speed (referred to as an extremely low speed). The start time of the transfer at the low-speed transfer rate is earlier than the start time of the transfer at the high-speed transfer rate, and the end time of the transfer at the low-speed transfer rate is a time not later than the end time t4 of the transfer at the high-speed transfer rate. The start time of the transfer at the extremely low-speed transfer rate is earlier than the start time of the transfer at the low-speed transfer rate, and the end time of the transfer at the extremely low-speed transfer rate is a time not later than the end time t4 of the transfer at the high-speed transfer rate. Using such transfer rates described above, the completion time of the read request from the host device 1 for which the commands with the same tag i attached are issued to each NAND memory is not delayed.

In using the high-speed transfer rate, the NAND controller 16-1 may set the ODT value to be low. In using the low-speed transfer rate, the NAND controller 16-1 may set the ODT value to be higher than that in the case of the high-speed transfer rate. In using the extremely low-speed transfer rate, the NAND controller 16-n may set the ODT value to be higher than that in the case of the low-speed transfer rate. That is, the ODT value may be set higher in the order of the high-speed transfer rate, the low-speed transfer rate, and the extremely low-speed transfer rate.

[1-4] Effect of First Embodiment

As described above, in the first embodiment, the memory system 2 includes the plurality of channels CH connected to the plurality of NAND memories NM. The memory controller 3 can operate the plurality of NAND memories NM in parallel by using the plurality of channels CH. Further, the transfer rate of some of the channels CH are set to be lowered based upon the time difference of the estimated completion times of the read commands operating in parallel without changing the scheduled estimated read completion time, in response to the read request from the host device 1. Further, the ODT value of the channel whose transfer rate is lowered is set to be high. Accordingly, the power to be consumed by the channel CH set at the low transfer rate can be reduced while maintaining the time required for the read operation.

Therefore, according to the first embodiment, the power consumption of the memory system 2 can be reduced while maintaining a high-speed operation.

[2] Second Embodiment

After the transfer rate of the target command is determined, for example, to be a low speed, the NAND controller 16 may further receive a command relating to the next read request. In a second embodiment, when the execution time of the next queued command is delayed due to lowering the transfer rate of the target command, the transfer rate of the target command is returned to a high speed.

[2-1] Operation of Memory System 2

Figure 8A:
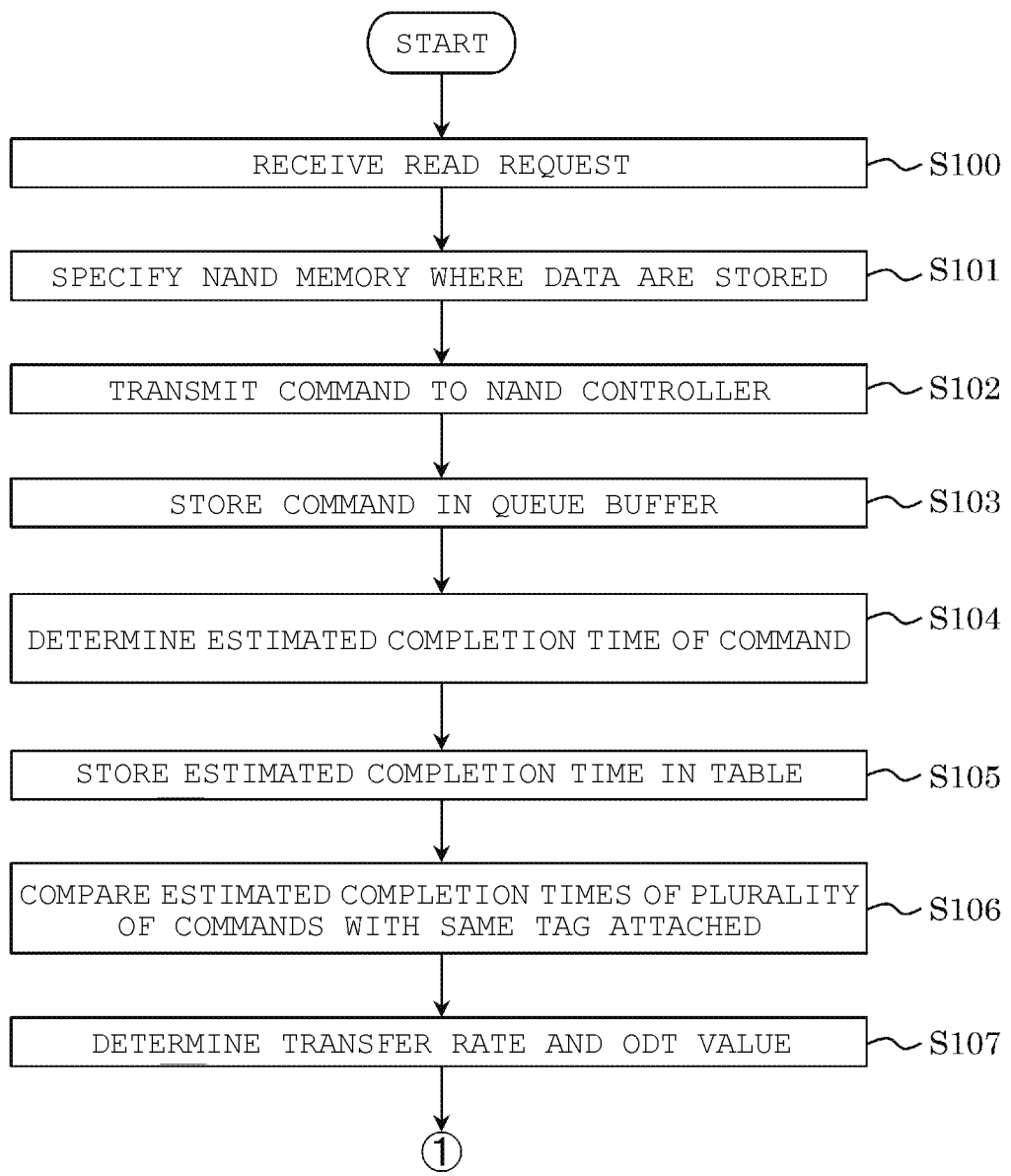
FIG. 8A is a flowchart illustrating a read operation of a memory system according to a second embodiment.
Figure 8B:
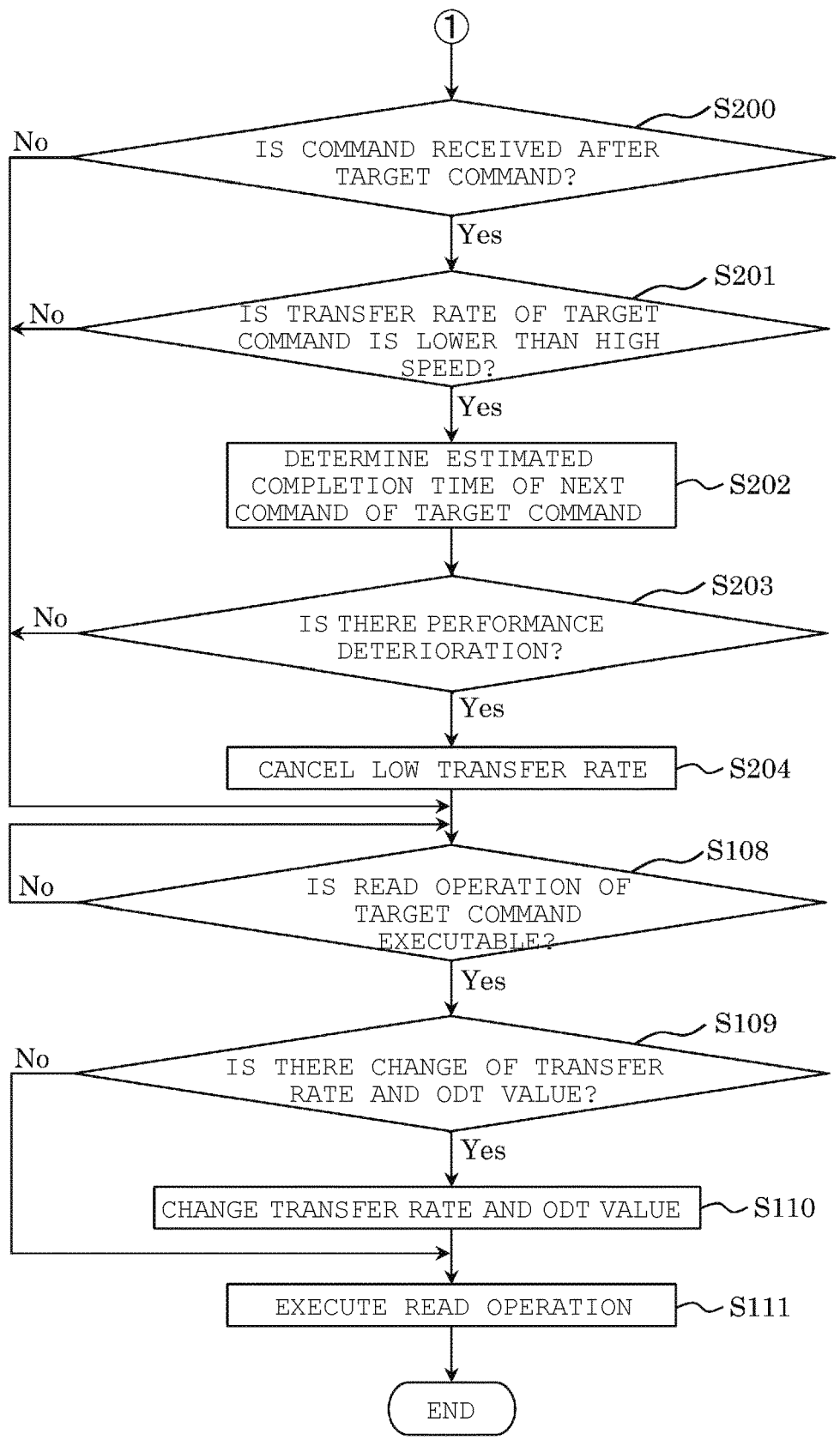
FIG. 8B is a flowchart illustrating the read operation of the memory system according to the second embodiment.

FIGS. 8A and 8B are flowcharts illustrating a read operation of the memory system 2 according to the second embodiment. The operations of steps S100 to S107 illustrated in FIG. 8A are the same as those of the first embodiment (FIG. 4).

The NAND interface control circuit 24 determines whether or not a command is received from the processor 11 after the target command (step S200). When the command is not received in step S200 (step S200=No), the NAND interface control circuit 24 proceeds to step S108.

When the command is received in step S200 (step S200=Yes), the NAND interface control circuit 24 determines whether or not the transfer rate of the target command is lower than the high speed (step S201). When the transfer rate of the target command is the high speed (step S201=No), the NAND interface control circuit 24 proceeds to step S108.

When the transfer rate of the target command is lower than the high speed (also referred to as the low transfer rate) (step S201=Yes), the NAND interface control circuit 24 determines an estimated completion time of the next command received after the target command (step S202).

The NAND interface control circuit 24 determines whether or not there is performance deterioration caused by setting the target command at the low transfer rate (step S203). For example, when the estimated completion time of the target command is the latest by comparing the estimated completion time of the next command with the estimated completion time of the command of the same tag to be executed through a channel CH different from the next command, it is determined that there is the performance deterioration. That is, the performance deterioration means that the estimated completion time of the next command received after the target command is delayed because the estimated completion time of the target command is delayed. When there is no performance deterioration (step S203=No), the processing proceeds to step S108.

When there is the performance deterioration (step S203=Yes), the NAND interface control circuit 24 cancels the low transfer rate (step S204). Specifically, the NAND interface control circuit 24 returns the transfer rate to the high speed. The subsequent operations of steps S108 to S111 are the same as those of the first embodiment.

Next, an example of a timing chart in the read operation according to the second embodiment will be described. The operation of changing the transfer rate according to the estimated read completion time is the same as that of FIGS. 6 and 7 shown in the first embodiment.

Figure 9:
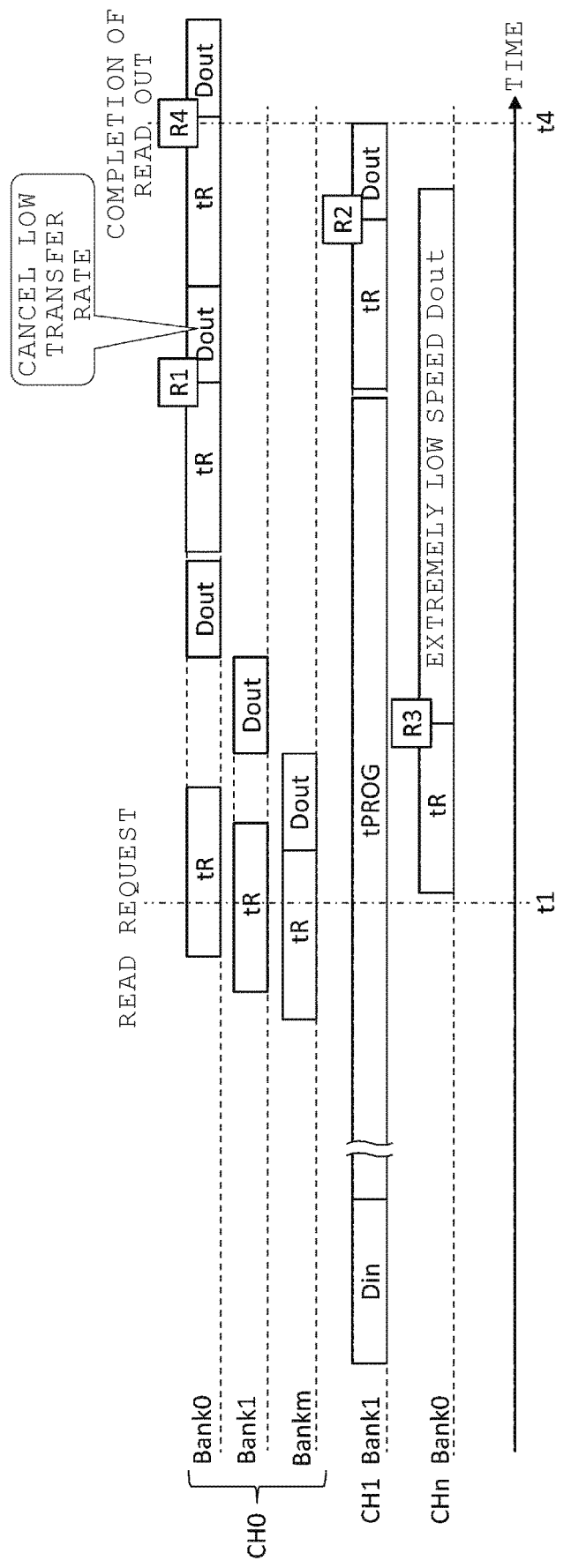
FIG. 9 illustrates an example of a timing chart when a low transfer rate is canceled according to the second embodiment.

FIG. 9 is an example of a timing chart when canceling the low transfer rate. The NAND controller 16-0 is assumed to receive a next command R4 after the target command. The command R4 is assumed to instruct read from the NAND memory NM0-0 connected to the channel CH0.

As illustrated in FIG. 9, the NAND controller 16-0 cancels the low transfer rate related to the command R1 and changes the transfer rate from the canceled low transfer rate to the high transfer rate. Thereafter, the NAND controller 16-0 processes the command R4.

[2-2] Effect of Second Embodiment

According to the second embodiment, when the next command is received after the transfer rate is changed to the low speed, the delay of the estimated read completion time of the next command can be prevented. Accordingly, the performance deterioration of the read operation can be prevented.

[3] Modification

In the above-described embodiments, the read operation of the memory system 2 is described, but the processing of changing the transfer rate and the ODT value may be applied to a write operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
first and second non-volatile memories; and
a memory controller configured to be respectively connected to the first and second non-volatile memories via first and second channels,
the memory controller configured to:
receive a first read request;
execute a first read operation to read first data from the first non-volatile memory and a second read operation to read second data from the second non-volatile memory in parallel for the first read request;
determine a first time at which the first read operation is scheduled to be completed and a second time at which the second read operation is scheduled to be completed; and
set a first transfer rate corresponding to the first channel to be lower than a second transfer rate corresponding to the second channel in response to determining that the first time is earlier than the second time.

2. The memory system according to claim 1, wherein the memory controller further includes:
a first termination resistance configured to be connected to the first channel; and
a second termination resistance configured to be connected to the second channel, and
the memory controller is configured to set a first resistance value of the first termination resistance to be higher than a second resistance value of the second termination resistance in a case where the first time is earlier than the second time.

3. The memory system according to claim 1, wherein the memory controller further includes:
a first setting circuit connected to the first channel, and to set a transfer rate corresponding to the first channel;
a second setting circuit connected to the second channel, and to set a transfer rate corresponding to the second channel;
a storage circuit configured to store information of the first and second transfer rates; and
a first control circuit configured to control the first and second setting circuits using the information stored in the storage circuit.

4. The memory system according to claim 3, wherein the memory controller further includes:

a second control circuit configured to issue a first command corresponding to the first read operation and a second command corresponding to the second read operation;
a first queue buffer configured to store the first command; and
a second queue buffer configured to store the second command, wherein
the first control circuit is configured to control an operation of the first non-volatile memory according to the first command stored in the first queue buffer, and an operation of the second non-volatile memory according to the second command stored in the second queue buffer.

5. The memory system according to claim 3, wherein the memory controller further includes:
a first table to store the first time; and
a second table to store the second time, wherein
the first control circuit is configured to calculate a time difference between the first time and the second time using the first table and the second table.

6. The memory system according to claim 1, wherein in response to receiving a second read request after the first read request, the memory controller is configured to change a transfer rate corresponding to the first channel to a third transfer rate higher than the first transfer rate.

7. The memory system of claim 6 according to claim 6, wherein
the memory controller is configured to change the transfer rate corresponding to the first channel to the third transfer rate based on determining that an estimated completion time of the first read request is later than an estimated completion time of the second read request.

8. A method comprising:
receiving a first command to read a first memory and a second command to read a second memory in parallel, the first memory coupled to a first channel and the second memory coupled to a second channel;
calculating a first estimated completion time of the first command and a second estimated completion time of the second command;
comparing the first estimated completion time and the second estimated completion time; and
determining, based on the comparison, a first transfer rate for the first channel and a second transfer rate for the second channel.

9. The method of claim 8, further comprising:
determining which of the first estimated completion time and the second estimated completion time is later to calculate a time difference; and
determining the first and second transfer rates based on the time difference.

10. The method of claim 9, further comprising:
determining that the first estimated completion time is earlier than the second estimated completion time; and
determining the second transfer rate to be higher than the first transfer rate.

11. The method of claim 10, further comprising:
determining a value of a first termination resistance connected to the first channel to be higher than a value of a second termination resistance connected to the second channel.

12. A memory system, comprising:
a memory controller, coupled to a first channel to which a first memory is coupled and a second channel to which a second memory is coupled, and configured to:

issue a first command to the first memory to read the first memory and a second command to the second memory to read the second memory in parallel with reading the first memory;

calculate a first estimated completion time of the first command and a second estimated completion time of the second command;

compare the first estimated completion time and the second estimated completion time; and determine, based on the comparison, a first transfer rate for the first channel and a second transfer rate for the second channel.

13. The memory system of claim 12, wherein the memory controller is configured to:

determine which of the first estimated completion time and the second estimated completion time is later to calculate a time difference; and determine the first and second transfer rates based on the time difference.

14. The memory system of claim 13, wherein the memory controller is configured to:

determine that the first estimated completion time is earlier than the second estimated completion time; and determine the second transfer rate to be higher than the first transfer rate.

15. The memory system of claim 14, wherein the memory controller is configured to:

determine a value of a first termination resistance connected to the first channel to be higher than a value of a second termination resistance connected to the second channel.

* * * * *